United States Patent [19]

Matsuyama et al.

[11] 4,455,344

[45] Jun. 19, 1984

[54] GRANULES WITH A NARROW PARTICLE SIZE DISTRIBUTION COMPRISING FILLER, CRYSTALLINE POLYOLEFIN POWDER AND BINDER

[75] Inventors: Kiyoshi Matsuyama; Kenji Ochi; Hiroyuki Ogawa; Takatoshi Suzuki, all of Ehime, Japan

[73] Assignee: Sumitomo Chemical Company, Limited, Osaka, Japan

[21] Appl. No.: 440,467

[22] Filed: Nov. 9, 1982

[30] Foreign Application Priority Data

Nov. 9, 1981 [JP] Japan .................. 56-180049

[51] Int. Cl.$^3$ .................. B32B 5/16; B32B 27/06
[52] U.S. Cl. .................. 428/327; 428/331; 428/404; 428/406; 428/407; 428/516; 428/520; 264/241
[58] Field of Search .............. 428/220, 404, 406, 407, 428/516, 327, 331

[56] References Cited

U.S. PATENT DOCUMENTS 3,971,753 7/1976 Frechtling et al. ............. 428/404 X
4,336,301 6/1982 Shaw ............................ 428/407 X

FOREIGN PATENT DOCUMENTS 51-45612 2/1976 Japan .
1443461 7/1976 United Kingdom .

*Primary Examiner*—P. Ives
*Attorney, Agent, or Firm*—Sughrue, Mion, Zinn, MacPeak & Seas

[57] ABSTRACT

Granules containing 60 wt. % or more filler, having such particle size distribution that 90 wt. % or more granular particles have a particle size of $(\frac{1}{3})d_{50}^b$ to $3d_{50}^b$ ($d_{50}^b$: mean particle size of the granules), and being produced by blending (a) 60 to 90 parts by weight of a filler having a mean particle size of 0.05 to 100$\mu$, (b) 5 to 35 parts by weight of crystalline polyolefin powder having a mean particle size ($d_{50}^a$) of 150 to 1,000$\mu$ and having such particle size distribution that 90 wt. % or more particles thereof have a particle size of $(\frac{1}{2})d_{50}^a$ to $2d_{50}^a$, (c) 5 to 35 parts by weight of a binder having a melting point lower than that of said crystalline polyolefin powder by a least 10°C., and optionally, (d) a compounding additive, at a temperature lower than the melting point of the crystalline polyolefin powder and higher than the melting point of the binder, is disclosed.

5 Claims, No Drawings

GRANULES WITH A NARROW PARTICLE SIZE DISTRIBUTION COMPRISING FILLER, CRYSTALLINE POLYOLEFIN POWDER AND BINDER

FIELD OF THE INVENTION

This invention relates to granules. More particularly, it relates to granules having a narrow particle size distribution comprising a filler, a crystalline polyolefin powder and a binder.

BACKGROUND OF THE INVENTION

Conventionally, pellets are formed by adding a filler and, if desired, compounding additives such as a stabilizer, a pigment, etc. to a crystalline polyolefin. Heat-melting and kneading are then carried out on the resulting mixture to make pellets. The pellets are then used in molding processing.

However, there are problems in obtaining pellets containing a large amount of filler in the above-described manner, because the filler generally has a finer particle size and smaller bulk density than a crystalline polyolefin powder. Examples of these problems are described below.

(1) a blend of a crystalline polyolefin powder and a filler separate from each other can cause segregation of the particles in a hopper; or when transporting the blend from hopper to hopper non-uniform dispersion of the filler can result.

(2) The blend causes bridging in a hopper or is poor in feeding with a screw of an extruder (or a kneader); this prolongs the plasticizing time, resulting in a series decrease in pelletizing ability or makes it impossible to carry out pelletization.

These defects become more serious as the amount of filler added increases. Therefore, in pelletizing polyolefin containing a large amount of filler, special consideration must be given with respect to the structure of the hopper, and that of the feeder for the blend of filler and crystalline polyolefin and that of the extruder screw. Accordingly, costly equipment is required. In addition, as the amount of filler increases, the resulting pellets, if produced, contain filler that is not uniformly dispersed which leads to poor appearance and poor mechanical properties of resulting moldings.

Thus, it has been extremely difficult, using prior art techniques, to produce granules containing a large amount of filler, particularly granules containing enough filler to be used as a master batch, by heat-kneading and subsequent pelletizing.

Japanese Patent Publication No. 45612/76, and U.S. Pat. Nos. 3,962,531, 3,997,494, 4,045,403, and 4,046,849 propose a process for producing a granular composition containing a comparatively large amount of solid powder in a thermoplastic resin without conducting the above-described pelletizing.

Japanese Patent Publication No. 45612/76 describes a process for producing a granular composition containing a thermoplastic resin and solid powder as major components. The process comprises adding a molten thermoplastic resin to a zone where the solid powder is in a fluid state under the action of strong stirring. However, this process requires an independent thermoplastic resin-melting system and a quantitative spraying means in addition to the mixing and stirring equipment.

Japanese Patent Publication No. 8228/79 describes a process for compounding a thermoplastic polymer material and a filler. The process comprises blending thermoplastic polymer particles with a particulate filler, gradually melting the surface portion of the thermoplastic polymer particles to thereby adhere and deposit the particulate filler onto the thus molten surface portion, and separating the thus obtained intimate mixture of the molten surface portion and the filler from the polymer particles. However, this process requires a narrow temperature range for gradually melting the polymer material, and is extremely difficult to control. In addition, in this process, the weight ratio of filler to polymer is at most 2 as described in the specification, which is quite different from that in the present invention. This is attributed to the fact that, as the amount of filler is increased, poor dispersibility of the filler results and, upon molding, there is serious deterioration of mechanical properties.

Furthermore, control of particle size and particle size distribution are so different in the above-described two processes that particles having uniform particle size are difficult to obtain.

The present inventors have carried out intensive investigations for obtaining granules containing a large amount of uniformly dispersed filler as a major component, which granules have a uniform particle size distribution and which can be used as a master batch. As a result the present inventors have found a process for obtaining granules containing a large amount of filler with crystalline polyolefin powder as nuclei, i.e., granules comprising a filler, crystalline polyolefin poweder, a binder having a melting point lower than that of the crystalline polyolefin powder and, if necessary, predetermined compounding additives.

SUMMARY OF THE INVENTION

An object of the present invention is to provide granules containing 60 wt% or more filler, having such particle size distribution that 90 wt% or more granular particles have a particle size of $(\frac{1}{3})d_{50}^b$ to $3d_{50}^b$ ($d_{50}^b$: mean particle size of the granules), and being produced by blending (a) 60 to 90 parts by weight of a filler having a mean particle size of 0.05 to 100$\mu$, (b) 5 to 35 parts by weight of crystalline polyolefin powder having a mean particle size ($d_{50}^a$) of 150 to 1,000$\mu$ and having such particle size distribution that 90 wt% or more particles thereof have a particle size of $(\frac{1}{3})d_{50}^a$ to $2d_{50}^a$, (c) 5 to 35 parts by weight of a binder having a melting point lower than that of said crystalline polyolefin powder by at least 10° C., and optionally, (d) a compounding additive, at a temperature lower than the melting point of the crystalline polyolefin powder and higher than the melting point of the binder.

The filler-containing granules obtained by the present invention have a uniform, narrow distribution of particle size. Surprisingly, the granules containing a large amount of filler can be directly molded by merely mixing them with a polyolefin powder obtained by a general process without pelletizing. The resulting moldings are equal to those obtained by conventional pelletizing and subsequent molding in appearance and mechanical properties due to a good dispersed state of the filler. Furthermore, the resulting moldings have better stability and mechanical properties than those produced by conventional processes because a heating process was not used in pelletizing.

DETAILED DESCRIPTION OF THE INVENTION

Examples of fillers to be used in the present invention include inorganic fillers such as silica, diatomaceous earth, alumina, titanium oxide, iron oxide, zinc oxide, magnesium oxide, pumice powder, aluminum hydroxide, magnesium hydroxide, calcium carbonate, magnesium carbonate, calcium sulfate, barium sulfate, talc, clay, mica, glass beads, carbon black, etc., organic fillers such as wood powder, coating refuse, pulp, paper powder, etc., and mixtures thereof. The size of the filler particles falls within the range of from 0.05 to 100μ, preferably 0.05 to 50μ. The size may properly be selected from the above-described range by taking into consideration the mean particle size of the particulate polyolefin. As smaller particles of crystalline polyolefin powder are used as the nuclei of the granules it becomes preferable to use finer filler particles.

Examples of crystalline polyolefin powder to be used as nuclei upon granulation include powders of ethylene or propylene homopolymer, random or block copolymers of ethylene and other α-olefins or of propylene and other α-olefins, and a mixture thereof. The crystalline polyolefin powder has a mean particle size ($d_{50}{}^a$) of 150 to 1,000μ and has particle size distribution such that 90 wt% or more of the particles have a particle size of ($\frac{1}{2}$)$d_{50}{}^a$ to $2d_{50}{}^a$.

If the particle size is too small, the particles may be blown about by air currents. If the particle size is 100μ or smaller there is an additional danger of dust explosion. If the particle size is too large or if the particle size distribution is too broad, the resulting granules are liable to have non-uniform particle size and contain insufficiently dispersed filler.

The more spherical the crystalline polyolefin powder particles, the more preferable they are.

Properties of the particulate polyolefin are fundamentally determined by the polymerization catalyst used for its production.

A process for producing a polymer containing propylene as a major component is illustrated below as an example of obtaining polyolefin having preferable properties suited for the present invention. That is, the polymer is obtained by polymerizing propylene or both propylene and another olefin in an excess liquid propylene or in gas phase in the presence or substantial absence of an inert solvent using a catalyst system. The catalyst system is comprised of titanium trichloride composition prepared by reducing titanium tetrachloride with an organoaluminum compound and activating the reduced product, an organoaluminum compound and, if necessary, an electron donative compound.

In addition, particulate polyolefins obtained by using a so-called supported type catalyst comprising a titanium compound supported on a carrier such as magnesium chloride can be used as well.

Specific examples of processes for preparing the titanium trichloride composition type or supported type catalyst are disclosed in a number of publications such as Japanese Patent Application (OPI) Nos. 34478/72, 76196/76, 33289/78, 112973/79, 119576/79, 11985/79, Japanese Patent Application No. 136065/80, etc. (The term "OPI" as used herein refers to a "published unexamined Japanese patent application", hereinafter the same.)

The amount of crystalline polyolefin powder is in the range of 5 to 35 parts by weight per 60 to 90 parts by weight of the filler depending upon the kinds and shapes of filler, binder, and the crystalline powder.

If the amount of the crystalline polyolefin powder is less than 5 parts by weight, it becomes difficult to obtain granules having a uniform particle size distribution.

The binder plays a role of strongly adhering filler, given compounding additives, and crystalline polyolefin powder to each other with the polyolefin powder as nuclei.

The binder must have a melting point lower than that of the crystalline polyolefin powder to be used as nuclei of the granules by at least 10° C. in order to produce granules and molding of resulting granules. A proper binder may be selected taking into consideration the melting point of the crystalline polyolefin powder.

Useful binders should have good compatibility with the crystalline polyolefin powder comprising the nuclei and with the crystalline polyolefin powder to be used upon direct molding of a master batch of the resulting granules containing a large amount of filler.

The binder is desirably a thermoplastic resin, examples of which include olefinic polymers such as polyethylene, ethylene-vinyl acetate copolymer, ethylene-unsaturated carboxylic acid ester copolymer (e.g., ethylene-methyl methacrylate copolymer, etc.), ethylene-unsaturated carboxylic acid metal salt copolymer (e.g., ethylene-magnesium or zinc acrylate copolymer, etc.), copolymer between propylene and other olefin (e.g., propylene-ethylene copolymer, propylene-butene-1 copolymer, etc.), polyethylene or polypropylene modified with unsaturated carboxylic acid such as maleic anhydride, ethylene-propylene rubber, atactic polypropylene, etc.; petroleum resins; polyalkylene glycols such as polyethylene glycol and polypropylene glycol; and the like, with the olefinic polymers being preferable.

In general, moldings of filler-containing polyolefin have higher rigidity and lower impact strength than that of filler-free moldings.

The use of olefinic polymer as a binder controls the deterioration of, or improves, the impact strength of the resulting molding, thus their use is preferable.

For example, when using particulate polypropylene, the use of atactic polypropylene, polyethylene, propylene-butene-1 copolymer, ethylene-propylene rubber, or the like as a binder serves to improve impact strength. Atactic polypropylene is particularly preferable due to its excellent compatibility with polypropylene. These binders may be used alone or in combination.

The amount of binder varies depending upon the kind and amount of filler but, usually, the weight ratio of binder/filler ranges from about 0.05/1.0 to about 0.4/1.0, preferably from about 0.05/1 to about 0.25/1.

If the weight ratio of binder/filler is less than 0.05/1.0, dispersibility of the filler becomes poor though the binder can bind filler particles strongly enough to form granules. If the weight ratio of binder/filler is more than 0.4/1, there might result adverse influences on physical properties (particularly rigidity) due to the increase in the relative proportion of the binder.

In producing granules according to the present invention, it is possible to simultaneously add compounding additives such as stabilizers, pigments, and other auxiliary agents.

The stabilizers are various antioxidants, light stabilizers, etc. conventionally added to improve the stability and quality of polyolefin, and may be used alone or in a combination of two or more.

Examples of the stabilizer include antioxidants such as 2,6-di-tert-butyl-p-cresol, calcium stearate, tetra [methylene-3-(3,5-di-t-butyl-4-hydroxyphenol)-propionate]-methane, etc., and light stabilizers such as 2-(2'-hydroxy-5'-methylphenyl)benzotriazole and 2-hydroxy-4-octylbenzophenone.

Other useful auxiliary agents include fire retardants such as antimony oxide, doedecachloropentacyclodecane, etc. and slipping agents.

Some of these stabilizers have a low melting point and exert and analogous function to that of a binder. However, independent use of such stabilizers is insufficient to uniformly and strongly adhere filler particles, other stabilizers, pigments, etc. The pigments may be organic or inorganic and are used for coloring the polyolefin.

One embodiment of the process of the present invention for granulating a filler is described below.

A jacketed high speed mixer for dry-blending particulate resins is used. The mixer is equipped with a stirrer to fluidize and blend and content at high speed and can heat the content. For example, it is possible to use a Henschel mixer, Super Mixer (trade name; made by Kawata Mfg. Co.), or the like. A filler, crystalline polyolefin powder, and binder having a melting point lower than that of the crystalline polyolefin powder by at least 10° C. are heated in the above-described mixer together with compounding additives such as a stabilizer, a pigment, etc. under mixing, to a temperature somewhat higher than the melting point of the binder.

Thus, the molten binder strongly and uniformly adheres to the crystalline polyolefin powder nuclei including the filler and the compounding additives therein. The contents of the mixer are removed after some cooling to obtain granules containing a large amount of filler and having good fluidity. When producing granules in the above-described manner, the melting point of the binder must be lower than that of the crystalline polyolefin powder by at least 10° C. in order to the crystalline polyolefin power from melting. To keep the powder from melting the greater the difference in melting point, the more preferable.

In order to improve dispersibility of the filler and minimize the time needed to melt the binder, the binder should possess as small particle size as possible. With atactic polypropylene, for example, a mean particle size of 0.5 cm can satisfactorily be used in the present invention.

Particle size and properties of granules obtained by the present invention can be controlled by properly changing the order of adding a filler, crystalline olefin powder, binder, and compounding additives (e.g., a stabilizer, a pigment, etc.) or by raising temperature at a different stage in the process.

The filler-containing granules obtained by the present invention have such a uniform, narrow particle size distribution that 90 wt% or more granules have a particle size falling within the range of $(\frac{1}{3})d_{50}{}^b$ to $3d_{50}{}^b$ taking $d_{50}{}^b$ as a mean particle size of the granules.

The filler-containing granules of the present invention are subjected to known molding processing such as injection molding, blow molding, extrusion molding, sheet molding, etc. without going through a pelletizing step.

In addition, as has been mentioned hereinbefore, the granules of the present invention can be directly molded by merely mixing them with a polyolefin powder obtained by an ordinary process in a predetermined proportion. Melt-pelletizing is not needed due to the uniform particle size, and the resulting moldings are equal in appearance and mechanical properties to conventional moldings obtained by molding pellets due to the good dispersed state of the filler.

As is described above, the use of the granules of the present invention as a master batch eliminates a pelletizing step. Accordingly, it is possible to obtain molding materials containing various amounts of a filler by merely blending. The molding can be easily colored by adding a pigment during production.

The filler-containing polyolefin moldings obtained by the above-described molding processing have a well-dispersed filler and can be suitably used as parts of automobiles such as cases for a car heater or air-conditioner, air cleaner case, instrument panel, etc. as well as the outer frame, support or other parts of household electric appliances such as a bedding drier, vacuum cleaner, refrigerator, speaker, record player, etc.

The present invention will now be described in more detail by referring to examples of preferred embodiments of the present invention which, however, are not to be construed as limiting the present invention in any way.

EXAMPLE 1

(1) Polymerization of propylene:

The atmosphere in a stainless steel-made, stirring type autoclave having an inside volume of 3,000 liters was replaced by nitrogen. Then, 1,800 g of diethylaluminum chloride and 50 g of titanium trichloride solid catalyst obtained by the process shown in Japanese Patent Application (OPI) No. 33289/78, Example 15, catalyst preparation 3, were charged in the autoclave, and hydrogen was introduced thereinto in an amount corresponding to a partial of 0.5 kg/cm$^2$.

Then, 840 kg of liquid propylene was pressed into the autoclave, and the autoclave was kept at 65° C. for 2 hours to polymerize.

After completion of the polymerization, unreacted monomer was purged, and 60 liters of methanol was added thereto to decompose the catalyst. The thus produced polypropylene was collected by centrifugation and dried at 60° C. under reduced pressure to obtain 240 kg of spherical particulate polypropylene having a uniform particle size. The melting point of this polypropylene was measured on a differential scanning calorimeter (made by Perkin-Elmer) and found to be 165° C.

This particulte polypropylene had a mean particle size of about 500μ and a bulk density of about 0.50 g/cc.

(2) Production of filler-containing granules:

A 1 kg/cm$^2$G steam was intorduced into the jacket of a 300-liter Super Mixer (trade name; made by Kawata Mfg. Co.). Then, 5 kg of the particulate polypropylene obtained in propylene polymerization (1), 33 kg of talc having a mean particle size of 8μ, 100 g of a stabilizer (tert-butyl-p-cresol: tetra[methylene-3-(3,5-di-tert-butyl-4-hydroxyphenyl)propionato]methane=2:1 by weight), and 7 kg of a binder of atactic polypropylene (made by Sumitomo Chemical Co., Ltd.; SK11A; melt viscosity: >5000 CPS) were thrown into the mixer and stirred at 720 rpm.

The stirring was stopped ten minutes after initiation of the stirring when the temperature of the mixture rose to 125° C., and the content inside the mixer was checked for the adhesion of talc. As a result, the adhesion was found to be sufficient, and therefore, the content was cooled to 80° C. and withdrawn out of the mixer to obtain talc-filled, free-flowing granules having a uniform particle size. The talc uniformly and strongly adhered so much that no talc parted even when the particles were strongly rubbed on one's hand with a finger.

The content showed the following particle size distribution:
larger than 10-mesh particles: 3.7%,
10- to 28-mesh particles: 93.0%,
smaller than 28-mesh particles: 3.3%.

(3) Molding:

The resulting granules were blended with the particulate polypropylene obtained in 1-(1) in the following three proportions:

|     | Granules | Particulate Polypropylene | Talc Content |
| --- | --- | --- | --- |
| (a) | 13.6 wt % | 86.4 wt % | 10 wt % |
| (b) | 27.3 | 72.7 | 20 |
| (c) | 54.5 | 46.5 | 40 |

The thus blended materials were directly molded using an injection molding machine (M-32-SJ; made by Meiki Mfg. Co.; screw diameter: 25 mm; injection amount: 1 ounce). No classification into particulate polypropylene and filler-containing granules was observed, and the blends were good in feeding and were plasticized in 12 to 13 seconds. The resulting moldings had good appearance with no silver streaks or foams or voids.

When part of the molding was formed into a thin sheet using a hot press to observe the dispersed state of talc, good dispersed state was confirmed.

EXAMPLE 2

(1) Compounding:

7 kg of the particulate polypropylene obtained in Example 1-(1) and 33 kg of calcium carbonate powder having a mean particle size of $2\mu$ were mixed with 100 g of the same stabilizer and 7 kg of the same atactic polypropylene as used in Example 1-(2) in the same manner as in Example 1-(2) to obtain granules having the same particles as in Example 1.
larger than 10-mesh particles: 5.2%,
10- to 28-mesh particles: 91.7%,
smaller than 28-mesh particles: 3.1%.

The resulting granules were blended with the particulate polyolefin obtained in Example 1-(1) in the following proportions:

|     | Granules | Particulate Polypropylee | Calcium Carbonate Content |
| --- | --- | --- | --- |
| (a) | 28.5 wt % | 71.5 wt % | 20 wt % |
| (b) | 57.0 | 43.0 | 40 |

(2) Molding:

The above-described blends were molded under the same conditions as in Example 1-(3). The results thus obtained are shown in Table 1.

EXAMPLE 3

(1) Compounding:

10 kg of the particulate polypropylene obtained in Example 1-(1), 25 kg of talc and 5 kg of atactic polypropylene used in Example 1-(2) were blended together with 100 g of a stabilizer in the same manner as in Example 1-(3).

The thus obtained granules had a particle size distribution as follows:
larger than 10-mesh particles: 1.3%,
10- to 28-mesh particles: 96.8%,
smaller than 28-mesh particles: 1.9%.

(2) Molding:

The granules obtained in Example 3-(1) were molded under the same conditions as in Example 1-(3).

The thus obtained molding had extremely good appearance, and talc was well dispersed therein.

EXAMPLE 4

(1) Preparation of filler-containing granules:

5 kg of the particulate polypropylene obtained in Example 1-(1), 35 kg of talc used in Example 1-(2), 100 g of a stabilizer, and 5 kg of 30-mesh sieve-passing powder of SUMIKATHENE ® G801 (low-density polyethylene; m.p.: 110° C.; made by Sumitomo Chemical Co., Ltd.) were blended in the same manner as in Example 1-(2).

Stirring was discontinued eight minutes after initiation of blending when the temperature rose to 115° C., and the content was cooled to 80° C. and withdrawn. Thus, free-flowing granules having the following particle size distribution were obtained:
larger than 10-mesh particles: 4.0%,
10- to 28-mesh particles: 92.5%,
smaller than 28-mesh particles: 3.5%.

(2) Molding:

The granules obtained in Example 4-(1) were blended with the particulate polypropylene obtained in Example 1-(1) in a granule/polypropylene ratio of 25.7/74.3, and molded under the same conditions as in example 1-(3). The results thus obtained are shown in Table 1.

EXAMPLES 5 TO 6

(1) Preparation of filler-containing granules:

In Example 5, wallastonite having a mean particle size of $15\mu$ was used in place of talc used in Example 1-(2) and, in Example 6, silica having a mean particle size of $10\mu$ was used in place of talc. Thus, there were prepared filler-containing granules respectively having a particle size distributions as follows:

|     | Example 5 | Example 6 |
| --- | --- | --- |
| larger than 10-mesh particles | 3.5 wt % | 4.2 wt % |
| 10- to 28-mesh particles | 94.2 | 93.3 |
| smaller than 28-mesh particles | 2.3 | 2.5 |

(2) Molding:

These granules were blended with the particulate polypropylene obtained in Example 1-(1) in the following proportions:

|     | Granules | Particulate Polypropylene | Filler Content |
| --- | --- | --- | --- |
| Example 5 | 27.3 wt % | 72.7 wt % | 20 wt % |
| Example 6 | " | " | " |

The resulting blends were molded under the same conditions as in Example 1-(3) to obtain the results shown in Table 1.

COMPARATIVE EXAMPLE 1

TABLE 1

| | Preparation of Filler-containing Granules | | | | Molding | | | |
|---|---|---|---|---|---|---|---|---|
| | Particulate Polypropylene | Filler | Binder | Final Temp. | Blending with Polypropylene | Filler Content (wt %) | Plasticizing Time (sec.) | Dispersed State of Filler |
| Ex. 1 | 5.0 Kg | Talc 33 Kg | Atactic polypropylene, 7 Kg | 125° C. | | | | |
| (-a) | | | | | yes | 10 | 11–13 | good |
| (-b) | | | | | " | 20 | " | " |
| (-c) | | | | | " | 40 | " | " |
| Ex. 2 | 7.0 Kg | Calcium carbonate, 33 Kg | Atactic polypropylene, 7 Kg | 125° C. | | | | |
| (-a) | | | | | yes | 20 | 11–13 | good |
| (-b) | | | | | " | 40 | " | " |
| Ex. 3 | 10 Kg | Talc 25 Kg | Atactic Polypropylene, 5 Kg | 125° C. | no | 62.5 | " | good |
| Ex. 4 | 5.0 Kg | Talc 35 Kg | Low-density polyethylene, 5 Kg | 115° C. | yes | 20 | 11–13 | good |
| Ex. 5 | 5.0 Kg | Wallastonite 33 Kg | Atactic Polypropylene, 7 Kg | 125° C. | yes | 20 | " | " |
| Ex. 6 | 5.0 Kg | Silica, 33 Kg | Atactic polypropylene, 7 Kg | 125° C. | yes | 20 | " | " |
| Comparative Example 1 | — | Talc 33 Kg | Atactic polypropylene, 7 Kg | 125° C. | | The particle size of the composition was too big to mold. | | |
| Comparative Example 2 | 5.0 Kg | Talc 33 Kg | Ethylene-propylene random copolymer 7 Kg | 165° C. | | The particle size of the composition was too big to mold. | | |

(1) Preparation of composition:

A composition was prepared in the same manner as in Example 1-(2) except for not using particulate polypropylene as nuclei.

Stirring was stopped when the temperature rose to 125° C., and the content inside the mixer was checked to find that large-sized particles having a particle size as large as about 1 cm or more were produced in a large amount, and that the particle size distribution was as broad as is shown below. This, of course, would make direct molding of the product difficult.

larger than 10-mesh particles: 58%,
10- to 28-mesh particles: 32%,
smaller than 28-mesh particles: 10%.

COMPARATIVE EXAMPLE 2

Procedures described Example 1-(2) were conducted except for using particulate ethylene-propylene random copolymer having a melting point of 158° C. in place of atactic polypropylene.

No adhesion of talc was observed even at 158° C., so stirring was continued. Adhesion of talc was observed when the temperature exceeded 163° C. However, the particulate polypropylene used as nuclei began to melt at about 165° C. An ampere meter of the mixer showed a sharp rise, maybe due to the above-described melting. Therefore, stirring was stopped. When the inside of the mixer was observed, blocks of more than 5 cm in diameter were produced. Accordingly, direct molding of the product was impossible. In addition, a large amount of the polymer adhered to the inside of the mixer.

While the invention has been described in detail and with reference to specific embodiments thereof, it will be apparent to one skilled in the art that various changes and modifications can be made therein without departing from the spirit and scope thereof.

What is claimed is:

1. Granules containing 60 wt% or more of a filler, 90 wt% or more of said granules having a particle size of $(\frac{1}{3})d_{50}^b$ to $3d_{50}^b$, wherein granules, said granules being produced by blending at least (a) 60 to 90 parts by weight of a filler having a mean particle size of 0.05 to 100$\mu$, (b) 5 to 35 parts by weight of a crystalline polyolefin powder having a mean particle size ($d_{50}^a$) of 150 to 1,000$\mu$, 90 wt% or more of the particles thereof having a particle size of $(\frac{1}{3})d_{50}^a$ to $2d_{50}^a$, and (c) 5 to 35 parts by weight of a binder having a melting point lower than that of said crystalline polyolefin powder by at least 10° C. at a temperature lower than the melting point of the crystalline polyolefin powder and higher than the melting point of the binder.

2. Granules as claimed in claim 1, wherein the filler particles have a mean particle size from 0.05 to 50$\mu$.

3. Granules as claimed in claim 1, wherein the weight ratio of the binder to the filler is within the range of from 0.05/1.0 to 0.4/1.0.

4. Granules as claimed in claim 3, wherein the ratio of the binder to the filler is within the range of from 0.05/1 to 0.25/1.

5. Granules as claimed in claim 1, wherein the binder is an olefinic polymer.

* * * * *